(12) United States Patent
Chen et al.

(10) Patent No.: US 12,507,197 B2
(45) Date of Patent: Dec. 23, 2025

(54) MANAGEMENT OF PERIPHERAL DEVICES USING WIRELESS BEACON SIGNALS

(71) Applicant: Hewlett-Packard Development Company, L.P., Spring, TX (US)

(72) Inventors: Xin-Chang Chen, Taipei (TW); He-Di Liu, Taipei (TW); Chia Hung Kuo, Taipei (TW); Chih-Hsin Lee, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 361 days.

(21) Appl. No.: 18/179,287

(22) Filed: Mar. 6, 2023

(65) Prior Publication Data

US 2024/0306120 A1 Sep. 12, 2024

(51) Int. Cl.
*H04W 64/00* (2009.01)
*H04B 17/27* (2015.01)
*H04B 17/318* (2015.01)

(52) U.S. Cl.
CPC .......... *H04W 64/003* (2013.01); *H04B 17/27* (2015.01); *H04B 17/318* (2015.01)

(58) Field of Classification Search
CPC .................................................. H04W 64/003
USPC ..... 455/456.1, 434, 574, 456.4, 456.3, 41.3,
455/404.2, 573, 572, 65, 343.1; 700/246,
700/282, 253, 245, 2
See application file for complete search history.

(56) References Cited

U.S. PATENT DOCUMENTS

| | | | |
|---|---|---|---|
| 8,971,930 B2 | 3/2015 | Li et al. | |
| 10,856,100 B2 | 12/2020 | Ahn et al. | |
| 2008/0316982 A1* | 12/2008 | Murty | H04W 48/02 |
| | | | 370/338 |
| 2008/0320108 A1* | 12/2008 | Murty | H04W 48/20 |
| | | | 709/220 |
| 2009/0186575 A1* | 7/2009 | Cedo Perpinya | H04L 67/306 |
| | | | 455/41.2 |
| 2013/0143499 A1* | 6/2013 | Ando | H04W 4/021 |
| | | | 455/41.2 |
| 2014/0162687 A1 | 6/2014 | Edge | |
| 2015/0141045 A1 | 5/2015 | Qiu et al. | |
| 2015/0271638 A1 | 9/2015 | Menayas et al. | |
| 2016/0055732 A1* | 2/2016 | Howard | A61B 5/02042 |
| | | | 382/118 |
| 2017/0156076 A1* | 6/2017 | Eom | H04W 24/10 |
| 2017/0213464 A1* | 7/2017 | Emadi | G06Q 20/322 |
| 2017/0249625 A1* | 8/2017 | Vossoughi | G06Q 30/0266 |
| 2018/0144322 A1* | 5/2018 | Unnerstall | G07F 13/025 |
| 2018/0225650 A1* | 8/2018 | Vossoughi | G06Q 30/02 |
| 2020/0014733 A1* | 1/2020 | Vanderheeren | H04L 12/1818 |
| 2020/0015034 A1 | 1/2020 | Ahn et al. | |
| 2020/0128482 A1* | 4/2020 | Daoura | H04W 4/80 |
| 2020/0219074 A1* | 7/2020 | Vossoughi | G06Q 20/10 |
| 2020/0275369 A1* | 8/2020 | Foster | H04W 52/322 |

(Continued)

*Primary Examiner* — Joseph Arevalo
(74) *Attorney, Agent, or Firm* — Quarles & Brady LLP (57) ABSTRACT

In an example, a computing device in a particular region is detected based on receipt by the computing device of a wireless beacon signal. A peripheral device connected to the computing device is identified in response to the detection. A location of the peripheral device is determined in response to a determination that the computing device has been moved to outside the particular region. A lost device notification is activated in response to the location being inside the particular region.

21 Claims, 7 Drawing Sheets

(56) References Cited

U.S. PATENT DOCUMENTS

| | | | | |
|---|---|---|---|---|
| 2020/0337162 | A1* | 10/2020 | Perkins | G04G 17/04 |
| 2021/0152976 | A1* | 5/2021 | Daoura | H04W 52/0254 |
| 2021/0256833 | A1* | 8/2021 | Daoura | H04W 4/021 |
| 2022/0006892 | A1* | 1/2022 | Perkins | G06F 3/02 |
| 2022/0165146 | A1* | 5/2022 | Daoura | H04W 8/005 |
| 2022/0246013 | A1* | 8/2022 | Worecki | G08B 21/0225 |
| 2022/0309899 | A1* | 9/2022 | Volkerink | G08B 21/182 |
| 2022/0335807 | A1* | 10/2022 | De Jong | H04W 12/63 |
| 2023/0106594 | A1* | 4/2023 | Vanderheeren | H04L 65/403 709/227 |
| 2023/0397050 | A1* | 12/2023 | Alvarado | H04W 28/20 |
| 2025/0126601 | A1* | 4/2025 | Furlong | H04M 1/72436 |

\* cited by examiner

| | | Geofence information |
|---|---|---|
|  | Outside (e.g., far away from) the region | Beacon signal not detected |
|  | Arrival at the region (at or near door) | MAC:EE:F7:D7:5E:E8:9E<br>RSSI: -72 dBm<br>Signal strength good |
|  | Dwelling in the region | MAC:EE:F7:D7:5E:E8:9E<br>RSSI: -35 dBm<br>Signal strength excellent |
|  | Departure from the region (at or near door) | MAC:EE:F7:D7:5E:E8:9E<br>RSSI: -72 dBm<br>Signal strength good |
|  | Outside (e.g., far away from) the region | Beacon signal not detected |

| | Movement information | Lid information | Connection information | Activity information |
|---|---|---|---|---|
|  | Moving | Closed | Disconnected to a peripheral device | Standby mode |
|  | Moving | Closed | Disconnected to a peripheral device | Standby mode |
|  | Motionless | Open | Connected to a peripheral device | Screen mirroring; typing |
|  | Moving | Closed | Disconnected to a peripheral device | Standby mode |
|  | Moving | Closed | Disconnected to a peripheral device | Standby mode |

FIG. 7:

MANAGEMENT OF PERIPHERAL DEVICES USING WIRELESS BEACON SIGNALS

BACKGROUND

The portability (e.g., mobility) of mobile computing devices, such as notebook computers, laptop computers, tablet computers, or other mobile personal computers (PCs), can be facilitated by using various electronic peripheral devices. For example, a mobile computing device may utilize various input or output devices such as headsets, speakers, mice, keyboards, pens, cellular modules, and the like. In some instances, the peripheral device may utilize wireless communication channels to exchange data with a mobile computing device, such as short-range radio signals.

DETAILED DESCRIPTION

The utilization of wireless communication channels facilitates the portability of the mobile computing device and the peripheral devices. For example, a user can easily transport and use the mobile computing device and a set of connected peripheral devices to the various locations (e.g., desk, conference rooms, etc.). However, for wirelessly connected peripheral devices, since these peripheral devices are not mechanically attached to the mobile computing device, it can be easy to leave a peripheral device behind when moving the mobile computing device to a different location. For example, in a general office scenario, a user entering a conference room may bring a mobile computing device and any number of wirelessly connected peripheral devices. The user may utilize or not utilize the previously connected peripheral devices, connect to additional peripheral devices (e.g., projectors), and may move to various locations within the conference room. In some scenarios, a user may leave the conference room and may unintentionally leave one or more previously wirelessly connected peripheral devices.

Certain examples described herein provide a system and method for avoiding loss of a peripheral device when moving a mobile computing device from one location to another. The system and method can utilize location information, often referred to as geofencing information, that can characterize location within a defined boundaries or zones and a list of peripheral devices used at a location in accordance with various aspects of the present application. Such aspects can include, but are not limited to: detect movement of the mobile computing device from the location, compare the listed peripheral devices to the peripheral devices still in wireless communication (e.g., actively wirelessly exchanging packets of information or having an established wireless connection to actively wirelessly exchange packets of information) with the mobile computing device, and activate (e.g., generate) a notification signal associated with (e.g., indicative of) an absence of a peripheral device.

In accordance with aspects of the present application, a mobile computing device can include software modules, or other executable code, that can provide automatic Bluetooth (BT) device asset tracking (e.g., a real-time, intelligent alert for an "anti-lost" user experience (UX)) utilizing background service operations, automatic geofence motion detection, BT device monitoring, and BT device lost alert notifications to the mobile computing device or another user device (e.g., smartphone) to reduce the probability of a peripheral device becoming lost or stolen. In accordance with other aspects of the present application, a mobile computing device (or set of devices) can provide user interfaces or notification mechanisms that provide real-time and efficient information related to management of wirelessly connected peripheral devices, without extra hardware costs for the computing device and without complex setup procedures, utilizing low energy and highly reliable beacon positioning support and existing wireless communication channels (e.g., Bluetooth interfaces) for ecosystem compatibility.

Figure 1:
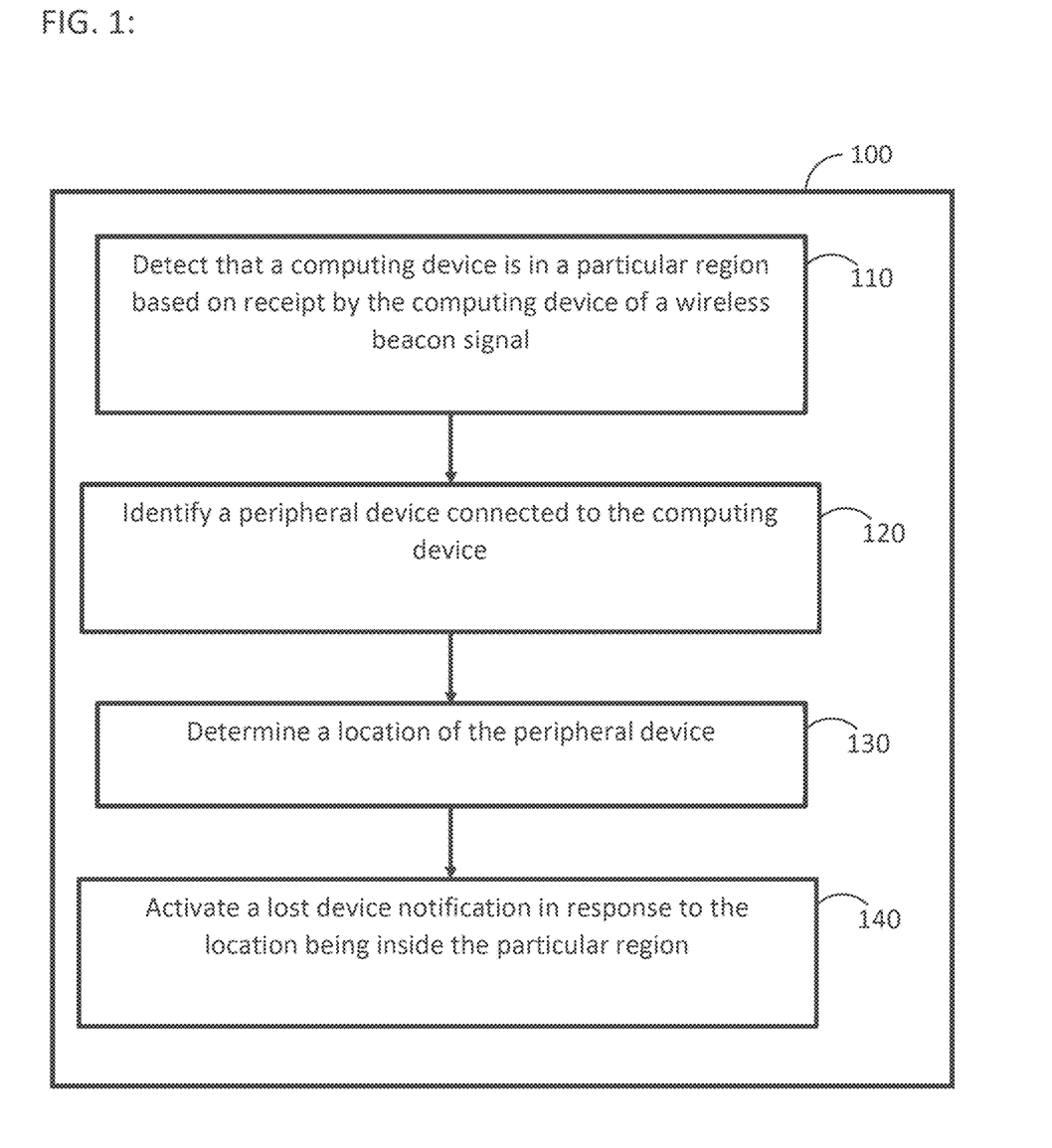
FIG. 1 is a flow diagram of an example method for generating notifications of a computing device missing an electronic peripheral device in accordance with certain examples described herein.
Figure 2A:
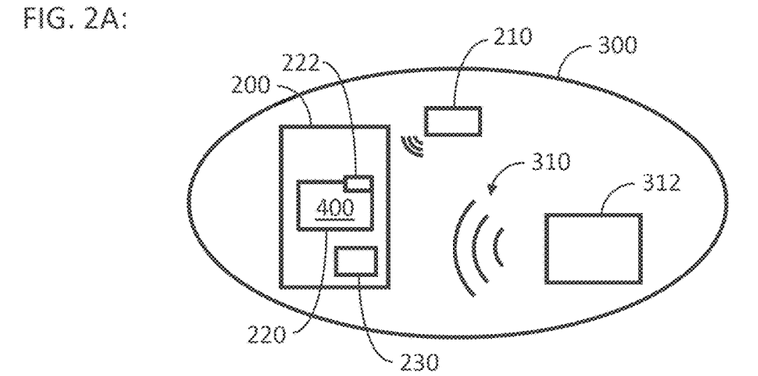
FIGS. 2A-2C schematically illustrate three example configurations in which a peripheral management component performs the example method in accordance with certain examples described herein.
Figure 2B:
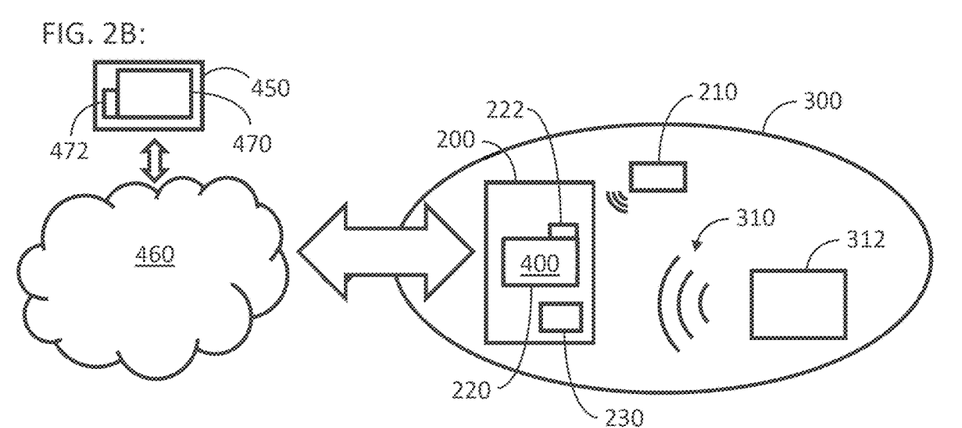
Figure 2C:
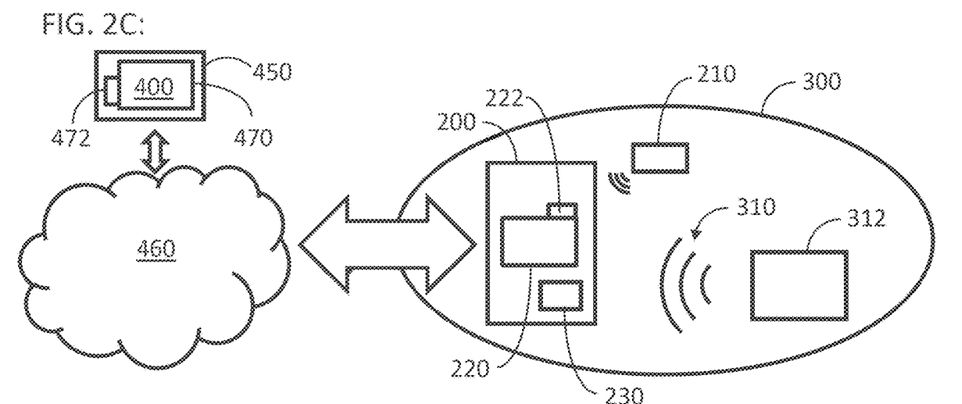

FIG. 1 is a flow diagram of an example method 100 for generating notifications of a computing device 200 missing an electronic peripheral device 210 in accordance with certain examples described herein. FIGS. 2A-2C schematically illustrate three example configurations in which a peripheral management component 400 performs the example method 100 in accordance with certain examples described herein. In an operational block 110, the method 100 comprises detecting that the computing device 200 is in a particular (e.g., predetermined) region 300 based on receipt by the computing device 200 of a wireless beacon signal 310 (e.g., generated within the particular region 300). In an operational block 120, the method 100 further comprises identifying, in response to said detecting, a peripheral device 210 connected to the computing device 200. For example, said identifying can comprise obtaining a monitoring list (e.g., a previously-generated monitoring list) of connected peripheral devices 210 connected to the computing device 200. In an operational block 130, the method 100 further comprises, in response to a determination (e.g., subsequent to said detecting) that the computing device 200 has been moved to outside the particular region 300, determine a location of the peripheral device 210 (e.g., relative to the computing device 200). In an operational block 140, the method 100 further comprises activating, in response to the location being inside the particular region 300, a lost device notification. For example, said determination of the location of the peripheral device 210 can comprise, in response to determining that the computer device 200 has been moved to outside the particular region 300, characterizing a peripheral device 210 of the monitoring list as not connected with the computing device 200 based on an absence of wireless communications between the peripheral device 210 and the computing device 200 (e.g., the peripheral device 210 is not in proximity to the computing device 200). The lost device notification can be associated with the peripheral device 210 inside the particular region 300 (e.g., characterized as not connected with the computing device 200).

In certain examples, the method 100 can be performed by a peripheral management component 400 comprising a processing unit (e.g., microprocessor; application-specific integrated circuits; generalized integrated circuits programmed by software with computer executable instructions; microelectronic circuitry; microcontrollers) executing various software applications. The processing unit can comprise or can be in operative communication with storage circuitry to store information (e.g., data; commands) accessed by the processing unit during operation (e.g., while providing the functionality of certain examples described herein). The storage circuitry can comprise a tangible (e.g., non-transitory) computer readable storage medium, examples of which include but are not limited to: read only memory (ROM); random access memory (RAM); magnetic disk storage media; optical storage media; flash memory. The storage circuitry can be encoded with software (e.g., a computer program downloaded as an application) comprising computer executable instructions for instructing the processing unit (e.g., executable data access logic, evaluation logic, and/or information outputting logic). The processing unit can execute the instructions of the software to provide functionality as described herein.

In certain examples, the computing device 200 comprises a personal computing device that is mobile and used in various locations. Examples of the computing device 200 include, but are not limited to: notebook computer; laptop computer; smartphone; smart tablet. In addition, the computing device 200 can be in wireless communication with a mobile electronic peripheral device 210 to be transported and used with the computing device 200. Examples of the mobile electronic peripheral device 210 compatible with certain examples described herein include, but are not limited to, user input or output device; keyboard; mouse; trackball; touchpad; pen; pointer; display device (e.g., image projector); computer memory device; headset; headphones; speaker. Examples of wireless communications between the computing device 200 and a peripheral device 210 include, but are not limited to, Bluetooth wireless communications.

The computing device 200 can also be in operational communication with a second computing device 450 via a network 460. The second computing device 450 can be located within the region 300 or outside the region 300. Examples of second computing devices 450 compatible with certain examples described herein include, but are not limited to, servers; smartphones; smart tablets; printers; projectors. As schematically illustrated by FIGS. 2B and 2C, a processing unit (e.g., microprocessor 220) of the computing device 200 can be in wired or wireless communication with the network 460 which is in wired or wireless communication with a processing unit (e.g., microprocessor 470) of the second computing device 450. Examples of networks 460 compatible with certain examples described herein include, but are not limited to: the Internet, Ethernet networks, wide area networks (WAN), wireless local area networks (WLAN), wireless fidelity (WiFi) networks, wireless gigabit alliance (WiGig) networks, wireless personal area networks (WPAN).

As schematically illustrated by FIGS. 2A and 2B, the peripheral management component 400 can be the microprocessor 220 of the computing device 200 and can be in operative communication with storage circuitry 222. As schematically illustrated by FIG. 2C, the peripheral management component 400 can be the microprocessor 470 (e.g., in operative communication with storage circuitry 472) of the second computing device 450 (e.g., server; smartphone; smart tablet) separate from the computing device 200 and in communication with the computing device 200 (e.g., via the network 460 as shown in FIG. 2C). In other examples, the functionality of the peripheral management component 400 can be split between the microprocessor 220 of the computing device 200 and the microprocessor 470 of the second computing device 450.

In certain examples, the region 300 comprises a geofence virtual boundary defined by a wireless beacon transmitter 312 within or in proximity to the region 300. For example, the region 300 bounded by the geofence virtual boundary can comprise a portion of an office environment (e.g., desk; cubicle; room; office of the user of the computing device 200 or of another individual; conference room; meeting room; multi-use space) containing the wireless beacon transmitter 312. While FIGS. 2A-2C each schematically illustrate a single wireless beacon transmitter 312 within a single region 300, multiple wireless beacon transmitters 312 can be used to define multiple geofence virtual boundaries of multiple regions 300. For example, the wireless beacon transmitter 312 can comprise a Bluetooth low energy (BLE) beacon tag or docking station to broadcast the wireless beacon signal 310 (e.g., a BLE beacon signal) comprising an identification (e.g., BLE beacon ID) identifying the wireless beacon transmitter 312 (e.g., media access control (MAC) address; internet protocol (IP) address) or the corresponding region 300 (e.g., name of the conference room). The wireless beacon transmitter 312 can broadcast the wireless beacon signal 310 persistently to nearby computing devices for proximity sensing and to dynamically adjust the geofence virtual boundary of the corresponding region 300.

The computing device 200 can comprise receiver circuitry 230 to receive (e.g., detect) the wireless beacon signal 310 and to generate geofence information (e.g., a geofence signal) associated with (e.g., indicative of) the received wireless beacon signal 310 or associated with (e.g., indicative of) the absence of a received wireless beacon signal 310. A threshold value can be set to correspond to the geometry of the region 300 and the location of the wireless beacon transmitter within the region 300, and a comparison of the received wireless beacon signal 310 to the threshold value can be used to generate the geofence information (e.g., the comparison providing distance ranging information). For example, the geofence information can be indicative of a comparison of a received signal strength intensity (RSSI) of the wireless beacon signal 310 to the threshold value (e.g., an RSSI greater than the threshold value indicative of the computing device 200 being within the region 300 and an RSSI less than the threshold value indicative of the computing device 200 being outside the region 300). In certain examples in which the transmitted power value for the wireless beacon signal 310 at the wireless beacon transmitter 312 is known or obtainable, the power value received by the computing device 200 can be used to determine the power loss during propagation of the wireless beacon signal 310 from the wireless beacon transmitter 312 to the computing device 200, and the power loss can be compared to a threshold value for the power loss to provide distance ranging information. For another example, the geofence information can be indicative of one or both of an angle of arrival (AoA) and an angle of departure (AoD) of the wireless beacon signal 310 (e.g., the AoA or AoD providing direction tuning information indicative of the position of the computing device 200 relative to the wireless beacon transmitter 312). The geofence information generated by the receiver circuitry 230 can also identify the region 300 corresponding to the received wireless beacon signal 310 (e.g., using the received BLE beacon ID).

Figure 3:
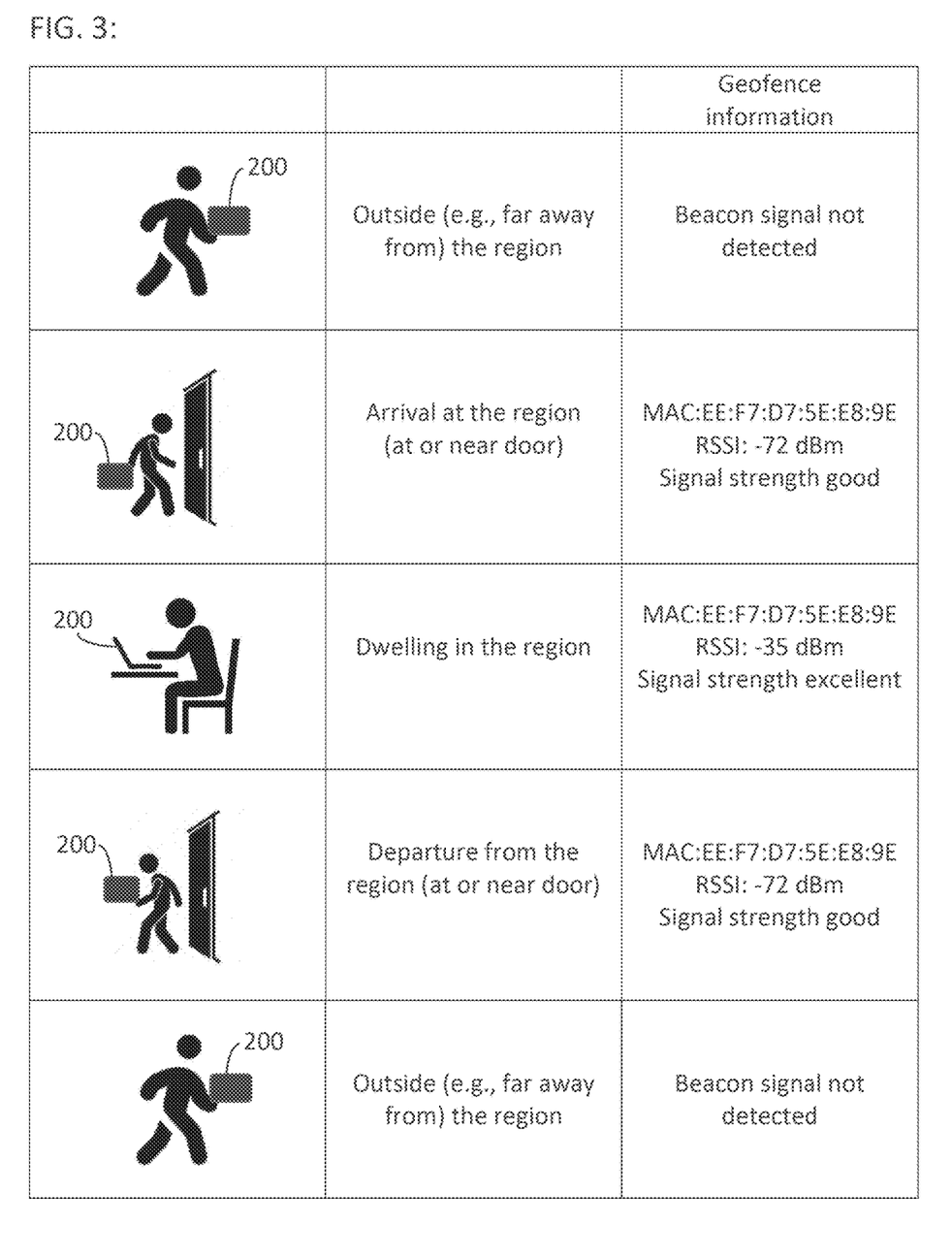
FIG. 3 schematically illustrates a correlation of various example locations of the computing device to geofence information from a wireless beacon signal from a wireless beacon transmitter within a portion of the region in accordance with certain examples described herein.

FIG. 3 schematically illustrates a correlation of various example locations of the computing device 200 to geofence information from a wireless beacon signal 310 from a wireless beacon transmitter 312 within a portion of the region 300 (e.g., within a room 600) in accordance with certain examples described herein. When the computing device 200 is outside the region 300 (e.g., when being carried by the user walking towards the region 300), the wireless beacon signal 310 is not detected by the receiver circuitry 230. When the computing device 200 has arrived at the region 300 (e.g., when the user reaches the door to enter the region 300), the wireless beacon signal 310 is detected by the receiver circuitry 230 with good signal strength (e.g., RSSI=−72 dBm) and the receiver circuitry 230 able to receive the BLE beacon ID (e.g., MAC address of the BLE wireless beacon transmitter 312). When the computing device 200 is dwelling inside the region 300 (e.g., the user is utilizing the computing device 200 within the region 300), the wireless beacon signal 310 is detected by the receiver circuitry 230 with excellent signal strength (e.g., RSSI=−35 dBm) and the receiver circuitry 230 continues to receive the BLE beacon ID. When the computing device 200 departs from the region 300 (e.g., when the user reaches the door to leave the region 300), the wireless beacon signal 310 is detected by the receiver circuitry 230 with good signal strength (e.g., RSSI=−72 dBm) and the receiver circuitry 230 continues to receive the BLE beacon ID. When the computing device 200 is outside the region 300 (e.g., when being carried by the user walking away from the region 300), the wireless beacon signal 310 is not detected by the receiver circuitry 230.

In certain examples, a single threshold value can be set and used for determining whether the computing device 200 is inside or outside the region 300. For example, the region 300 can comprise a large conference room and the wireless beacon transmitter 312 can comprise a BLE beacon transmitter located at or near a center of the conference room and emitting a wireless beacon signal 310 comprising a BLE beacon signal with a power value of 11.5 dBm (FCC BLE) and an operational frequency of 2.4 GHz. The threshold value can be defined (e.g., at an RSSI equal to −60 dBm) such that an RSSI greater than the threshold value is indicative of the computing device 200 being closer than a distance (e.g., 6 meters) from the wireless beacon transmitter 312 (e.g., a distance at which the computing device 200 is inside the conference room), and such that an RSSI less than the threshold value is indicative of the computing device 200 being farther than the distance (e.g., 6 meters) from the wireless beacon transmitter 312 (e.g., a distance at which the computing device 200 is outside the conference room).

In certain examples, multiple threshold values can be set and used for determining whether the computing device 200 is inside or outside the region 300. Certain such examples can provide a more accurate distance ranging determination of the location of the computing device 200 inside or outside of the region 300 than using a single threshold value. For example, the region 300 can comprise a small meeting room and the wireless beacon transmitter 312 can comprise a BLE beacon transmitter located at or near a center of the meeting room and emitting a wireless beacon signal 310 comprising a BLE beacon signal with a power value of 11.5 dBm (FCC BLE) and an operational frequency of 2.4 GHz. A first threshold value can be defined (e.g., at −44 dBm) such that an RSSI greater than the first threshold value is indicative of the computing device 200 being closer than a first distance (e.g., 2 meters) from the wireless beacon transmitter 312 (e.g., a first distance at which the computing device 200 is highly likely to be inside the conference room), and a second threshold value can be defined (e.g., at −70 dBm) such that an RSSI less than the second threshold value is indicative of the computing device 200 being farther than a second distance (e.g., 10 meters) from the wireless beacon transmitter 312 (e.g., a second distance at which the computing device 200 is highly likely to be outside the conference room). For RSSI values between the first and second threshold values, the computing device 200 can be determined to be likely inside the conference room. Thus, comparison of the RSSI to the multiple threshold values can provide higher granularity in the determination of whether the computing device 200 is inside or outside the region 300.

The geofence information generated by the receiver circuitry 230 can be provided to the peripheral management component 400 of the computing device 200 (see, e.g., FIGS. 2A and 2B) or to the peripheral management component 400 of the second computing device 450 (see, e.g., FIG. 2C). In certain examples, the geofence information is used by the peripheral management component 400 for evaluating whether the computing device 200 is within the region 300 or is outside the region 300 (e.g., to generate information indicative of whether the computing device 200 is within the region 300 or outside the region 300). For example, the peripheral management component 400 can set a flag corresponding to the region 300 to a value (e.g., InsideRoomFlag[x] equal to 1 or 0, where x identifies the region 300) that is associated with (e.g., indicative of) the computing device 200 being within or outside the region 300 in response to the geofence information.

In certain other examples, other information (e.g., sensor information), in addition to the geofence information, can be provided to and used by the peripheral management component 400 for evaluating whether the computing device 200 is within the region 300 or is outside the region 300. For example, the computing device 200 can comprise an inertial navigation sensor to provide inertial navigation tracking information regarding the position of the computing device 200. Examples of inertial navigation sensors compatible with certain examples described herein include, but are not limited to, one-, two- or three-axis accelerometers and one-, two-, or three-axis gyroscopes. The tracking information can be used by the peripheral management component 400, in conjunction with the geofence information, to determine whether the computing device 200 is within or outside the region 300. For example, the peripheral management component 400 can access a preloaded map of an environment including the region 300 upon system boot-up (e.g., of the computing device 200; of the computing device on which the peripheral management component 400 resides), or upon detection by the receiver circuitry 230 of the wireless beacon signal 310 corresponding to the region 300.

The peripheral management component 400 can access tracking information from an automatic geofence arrival and departure detection module running in background that begins when the wireless beacon signal 310 is detected, continues by periodically calculating an updated position of the computing device 200 (e.g., relative to the preloaded map) at regular intervals (e.g., every 10 seconds) using the tracking information, and terminates calculating the updated positions when no wireless beacon signal 310 is detected. FIGS. 4A-4D schematically illustrate example usage of both the geofence information and the tracking information in determining whether the computing device 200 is within a room 600 within the region 300 in accordance with certain examples described herein. Upon detection of the wireless beacon signal 310, a first/initial position 610 of the computing device 200 can be set (e.g., using a known location of the wireless beacon transmitter 312 and the geofence information such as RSSI distance ranging and AoA/AOD direction assistance) and the tracking information can be used to calculate subsequent positions of the computing device 200 relative to the first position 610 and to track whether the computing device 200 is within or outside the room 600.

Figure 4A:
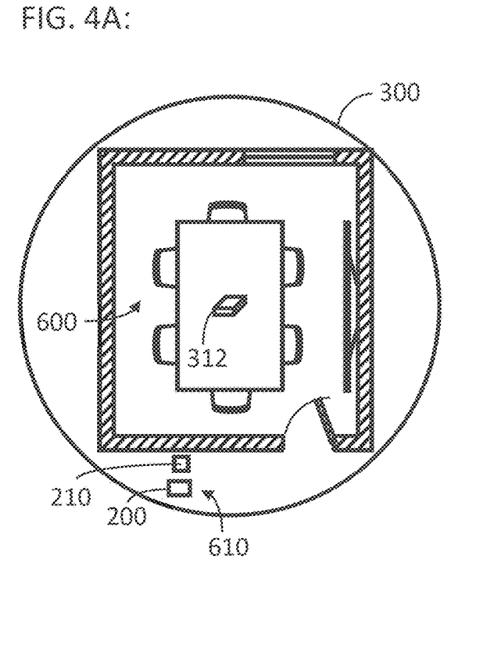
FIGS. 4A-4D schematically illustrate example usage of both the geofence information and the tracking information in determining whether the computing device is within a room within the region in accordance with certain examples described herein.
Figure 4B:
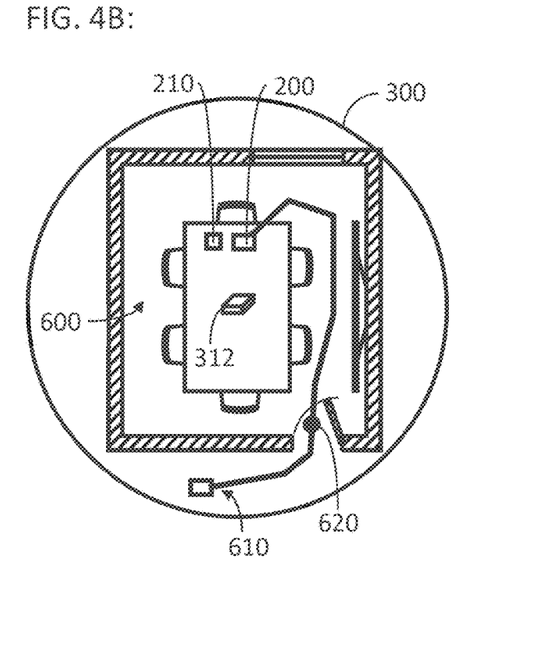

As schematically illustrated by FIG. 4A, the first position 610 (e.g., the position at which the wireless beacon signal 310 is initially detected) can be within the region 300 but outside the room 600. With the computing device 200 at the first position 610, the InsideRoomFlag[x] corresponding to the region 300 can remain or be set to a value of 0, and inertial navigation tracking of the subsequent positions of the computing device 200 can be performed. As schematically illustrated by FIG. 4B, upon the tracking information indicating that a subsequent second position 620 is inside the room 600, the InsideRoomFlag[x] corresponding to the region can be switched to a value of 1, and the inertial navigation tracking can continue until the wireless beacon signal 310 is not detected. FIGS. 4A and 4B schematically illustrate the peripheral device 210 being moved from outside the room 600 to inside the room 600 along with the computing device 200.

Figure 4C:
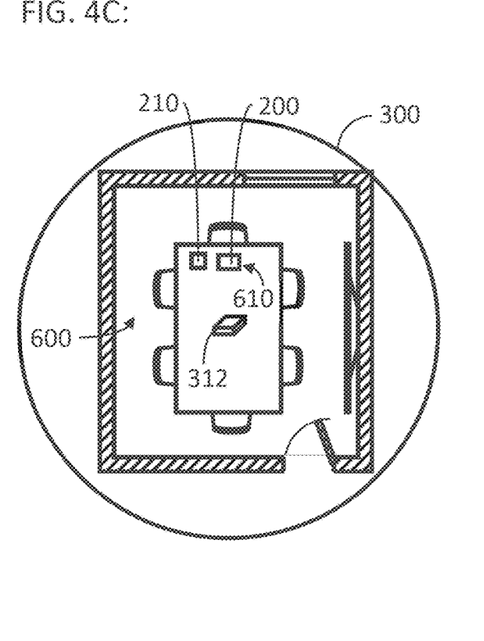
Figure 4D:
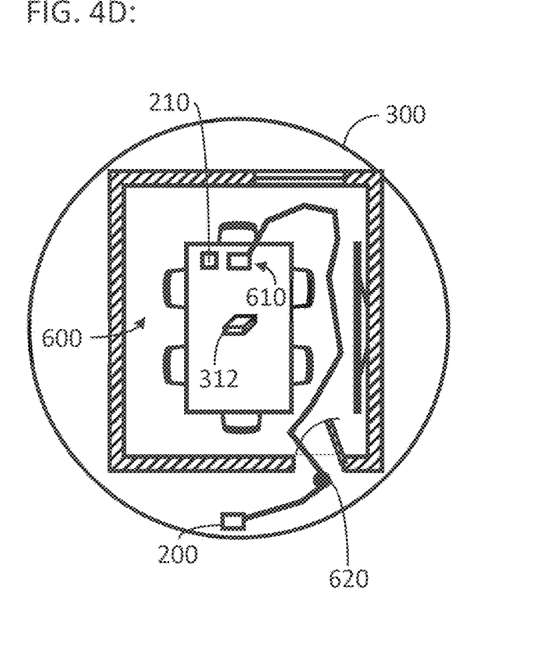

As schematically illustrated by FIG. 4C, the first position 610 can be within the region 300 and within the room 600. For example, the first position 610 can be the position at which the wireless beacon signal 310 is initially detected (e.g., the computing device 200 is turned on while the computing device 200 is within the room 600). For another example, the first position 610 can be the position within the room 600 from which the computing device 200 begins to move after being substantially motionless. With the computing device 200 at the first position 610, the InsideRoomFlag[x] corresponding to the region 300 can remain or be set to a value of 1, and inertial tracking of the subsequent positions of the computing device 200 can be performed. As schematically illustrated by FIG. 4D, upon the tracking information indicating that a subsequent second position 620 is outside the room 600, the InsideRoomFlag[x] corresponding to the region can be switched to a value of 0, and the inertial navigation tracking can continue until the wireless beacon signal 310 is not detected. FIGS. 4C and 4D schematically illustrate the peripheral device 210 being within the room 600 with the computing device 200 but left behind in the room 600 when the computing device 200 is removed from the room 600.

Figure 5:
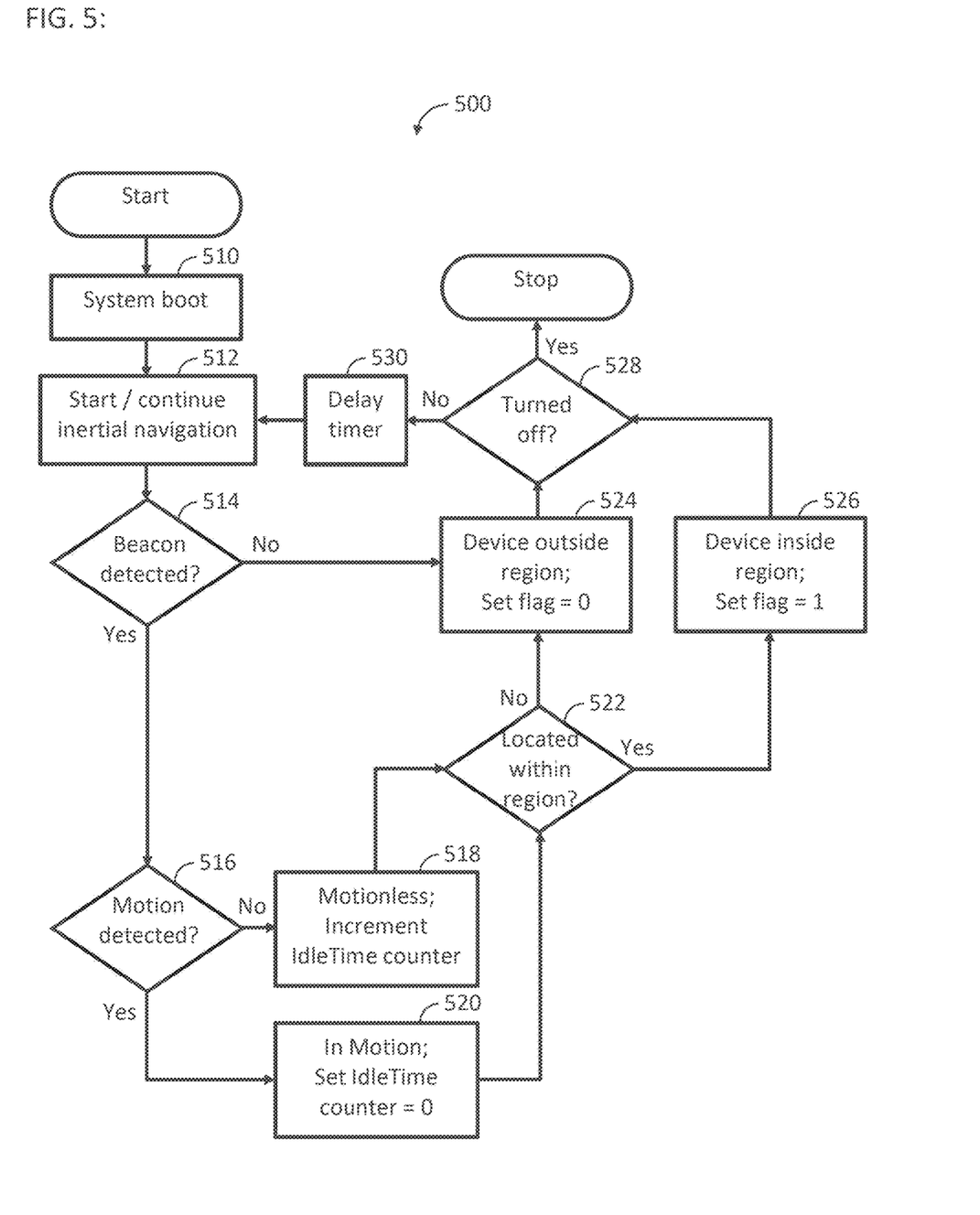
FIG. 5 is a flow diagram of an example method for automatic geofence arrival and departure detection in accordance with certain examples described herein.

FIG. 5 is a flow diagram of an example method 500 for automatic geofence arrival and departure detection in accordance with certain examples described herein. The detection that the computing device 200 is in the region 300 is based in part on the geofence information (e.g., receipt by the computing device 200 of the wireless beacon signal 310 generated within the region 300) and in part on the inertial navigation tracking information (e.g., generated by a module running in background), and can be performed in the operational block 110 of the example method 100 described herein. For example, the method 500 can be performed by a background service operation of the computing device 200 which utilizes both geofence information and tracking information (e.g., a hybrid and heuristic background service operation).

In an operational block 510, the method 500 comprises a system boot of an operating system of the device on which the peripheral management component 400 is run (e.g., the computing device 200). The map of the office environment (e.g., meeting room map) to be used with the tracking information can be preloaded or loaded upon the system boot to be accessible by the peripheral management component 400. In an operational block 512, the method 500 comprises starting the inertial navigation tracking. For example, an automatic geofence arrival and departure detection module can begin running in background and can periodically (e.g., at temporal intervals of 0.5 second to 2 seconds) calculate a position of the computing device 200 in response to signals from the inertial navigation sensor (e.g., 3-axis motion sensor). In an operational block 514, the method 500 comprises evaluating (e.g., checking) whether any wireless beacon signals 310 (e.g., comprising a BLE beacon ID) are detected (e.g., by the receiver circuitry 230 of the computing device 200). In an operational block 524, the method 500 comprises, upon the evaluation determining that a wireless beacon signal 310 is not detected, setting a flag (e.g., InsideRoomFlag[x]) to zero.

In an operational block 516, the method 500 comprises, upon the evaluation determining that a wireless beacon signal 310 is detected, evaluating (e.g., checking) whether the tracking information indicates that the computing device 200 has moved from a previously-calculated position. In an operational block 518, the method 500 comprises, if the tracking information indicates that the computing device 200 has not moved from the previously-calculated position (e.g., the computing device 200 has been motionless), incrementing a counter (e.g., IdleTime counter) of the number of temporal intervals during which the computing device 200 has remained motionless. In an operational block 520, the method 500 comprises, if the tracking information indicates that the computing device 200 has moved from the previously-calculated position (e.g., the computing device 200 is in motion), resetting the counter of the number of temporal intervals during which the computing device 200 has remained motionless to zero. In certain examples, the value of the counter can be used as movement information associated with (e.g., indicative of) the computing device 200 being in the region 300 (e.g., room 600) or not, as described herein.

In an operational block 522, the method 500 comprises evaluating (e.g., calculating) whether the tracking information indicates that the computing device 200 is within the region 300 (e.g., within the room 600 identified by the wireless beacon signal 310). In an operational block 524, the method 500 comprises, if the tracking information indicates that the computing device 200 is outside the region 300 (e.g., outside the room 600), setting a flag (e.g., InsideRoomFlag [x]) to zero. In an operational block 526, the method 500 comprises, if the tracking information indicates that the computing device 200 is within the region 300 (e.g., within the room 600)), setting the flag to 1.

In an operational block 528, the method 500 comprises evaluating (e.g., checking) whether the user has terminated the automatic geofence arrival and departure detection (e.g., manually turned off the background service operation of the peripheral management component 400). In an operational block 530, the method 500 comprises, if the user has not terminated the automatic geofence arrival and departure detection, waiting for the temporal interval before continuing the inertial navigation in the operational block 512. If the user has terminated the automatic geofence arrival and departure detection, the method 500 is terminated.

Figure 6:
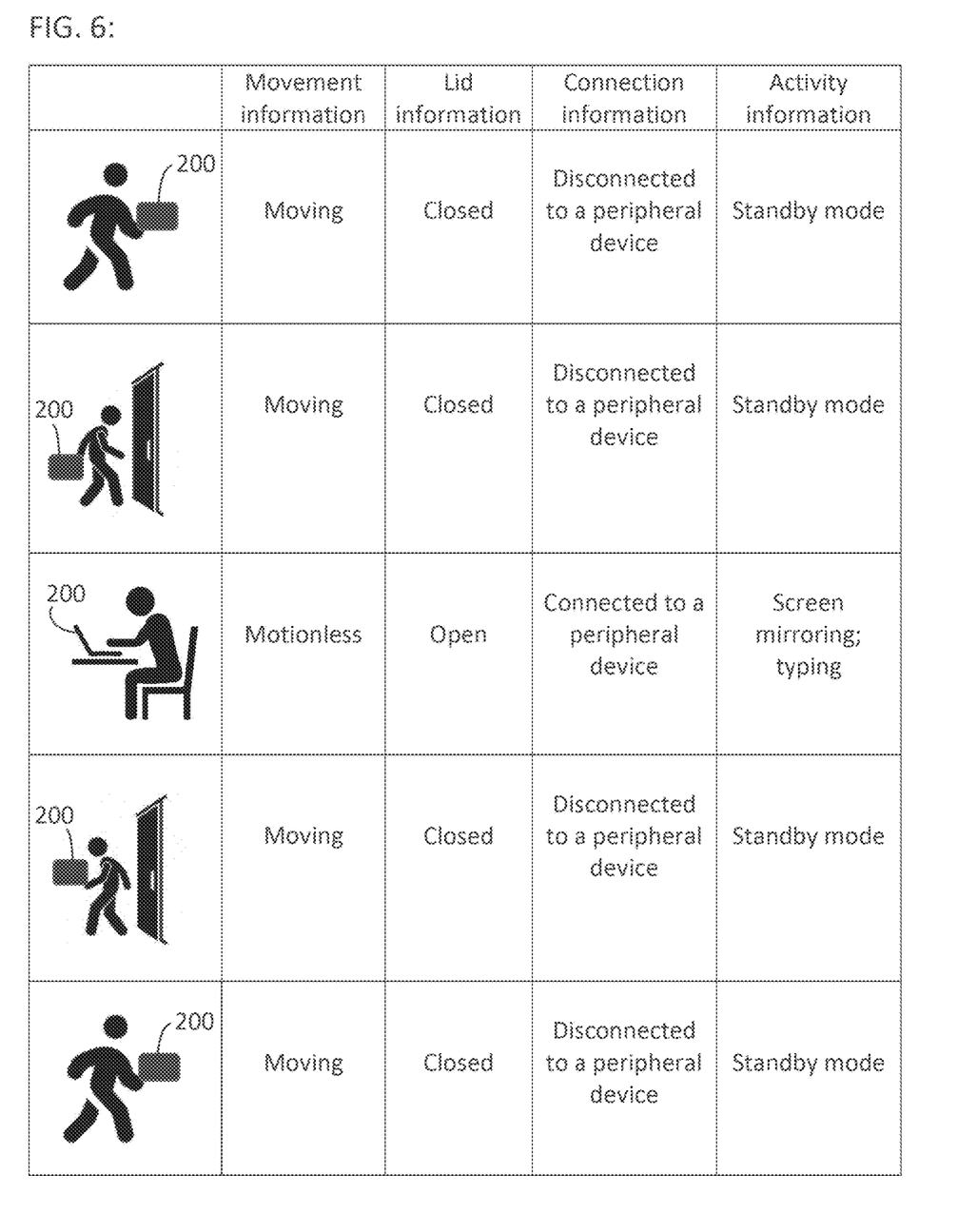
FIG. 6 schematically illustrates a correlation of various example locations of the computing device to other information in accordance with certain examples described herein.

FIG. 6 schematically illustrates a correlation of various example locations of the computing device 200 to other information in accordance with certain examples described herein. For example, the tracking information from the inertial navigation sensor of the computing device 200 can generate movement information provided to and used by the peripheral management component 400, in addition to the geofence information generated by the receiver circuitry 230, for evaluating whether the computing device 200 is within the region 300 or is outside the region 300. For example, as described herein with regard to FIG. 5, a value of a counter (e.g., IdleTime counter) can be indicative of the length of time that the computing device 200 has remained substantially motionless. The computing device 200 can be considered to be outside the region 300 if the movement information is indicative of the computing device 200 moving at a speed greater than a threshold value (e.g., 4 meters per hour; indicative of the computing device 200 traveling in a vehicle or being carried by a walking user) or if the movement information is indicative of the computing device 200 moving for a temporal period greater than a threshold value (e.g., 3 minutes). The computing device 200 can be considered to be inside the region 300 if the movement information is indicative of the computing device 200 remaining substantially motionless for a temporal period greater than a threshold value (e.g., 3 minutes).

For another example, the computing device 200 can comprise a sensor (e.g., Hall sensor; switch) to generate lid information regarding the status of a lid of the computing device 200 (e.g., whether the lid is open or closed) and the lid information can be used by the peripheral management component 400, in conjunction with the geofence information, to determine whether the computing device 200 is within or outside the region 300. The computing device 200 can be considered to be outside the region 300 if the lid information is indicative of the existence of a closed state of the lid and the computing device 200 can be considered to be inside the region 300 if the lid information is indicative of the existence of an open state of the lid.

For another example, the computing device 200 can generate connection information regarding whether a peripheral device 210 (e.g., user input or output device; keyboard; mouse; trackball; touchpad; pen; pointer; display device; computer memory device; headset; headphones; speaker) is in wireless communication with the computing device 200 or not. The connection information can be used by the peripheral management component 400, in conjunction with the geofence information, to determine whether the computing device 200 is within or outside the region 300. The computing device 200 can be considered to be inside the region 300 if the connection information is indicative of a connection (e.g., pairing) of the computing device 200 with a peripheral device 210 and the computing device 200 can be considered to be outside the region 300 if the connection information is indicative of the absence of a connection (e.g., pairing) of the computing device 200 with a peripheral device 210.

For another example, the computing device 200 can generate activity information regarding an activity in which the computing device 200 is being used. The activity information can be used by the peripheral management component 400, in conjunction with the geofence information, to determine whether the computing device 200 is within or outside the region 300. The computing device 200 can be considered to be inside the region 300 if the activity information is indicative of the computing device 200 being used in an activity expected to occur within the region 300 but not outside the region (e.g., screen mirroring; typing) and can be considered to be outside the region 300 if the activity information is indicative of the computing device 200 not being used with such an activity (e.g., being in a system standby or sleep mode).

In certain examples, the peripheral management component 400 obtains a monitoring list of connected peripheral devices 210 (e.g., a previously-generated list of peripheral devices 210 in wireless communication with the computing device 200) based on monitored wireless communications between the connected peripheral devices 210 and the computing device 200 (e.g., performing the operational block 120 of FIG. 1) while the computing device 200 is within the region 300 (e.g., room 600). For example, the computing device 200 can be running a BT Device Monitoring Mechanism which generates and maintains the monitoring list as a background service operation, the monitoring list accessible by the peripheral management component 400. The BT Device Monitoring Module can periodically (e.g., at regular intervals) scan for the wireless connection status of any registered peripheral devices 210 with the computing device 200 while the computing device 200 is within the region 300 (e.g., room 600) and update the monitoring list (e.g., BTDeviceMonitor[ID #]) accordingly (e.g., adding a connected peripheral device 210 that is currently not on the monitoring list; keeping a connected peripheral device 210 on the monitoring list; removing a peripheral device 210 that is not currently connected from the monitoring list). A peripheral device 210 can be characterized (e.g., identified) as connected if there is an established wireless channel for communications between the peripheral device 210 and the computing device 200 and the wireless channel exists, or if there are wireless ping signals being exchanged between the peripheral device 210 and the computing device 200. The peripheral management component 400 can maintain a single monitoring list or multiple monitoring lists, each associated with a corresponding region 300 (e.g., room 600). If the user terminates the wireless communication between the peripheral device 210 and the computing device 200 (e.g., disconnecting the peripheral device 210 from the computing device 200; turning off the peripheral device 210), the monitoring list can be updated to omit the peripheral device 210.

The peripheral management component 400 can generate and maintain the monitoring list by identifying the connected peripheral devices 210 (e.g., peripheral devices 210 in wireless communication with the computing device 200 in the region 300) and can dynamically generate or update the monitoring list to include the identified peripheral devices 210 (e.g., the peripheral devices 210 characterized as connected peripheral devices 210). For example, the peripheral management component 400 can receive a first signal indicative of whether the computing device 200 is within the region 300 or outside the region 300 (e.g., the first signal indicative of information selected from the group consisting of: the geofence information, tracking information, movement information, lid information, connection information, and activity information) and can receive a second signal indicative of the peripheral device 210 being in wireless communication with the computing device 200 (e.g., the second signal generated in response to determining whether the computing device 200 is receiving wireless communication signals from the peripheral device 210). In response to the first signal indicating that the computing device 200 is within the region 300 concurrently with the second signal indicating that the peripheral device 210 is in wireless communication with the computing device 200, the peripheral management component 400 can generate, obtain, or maintain the monitoring list (e.g., to include the peripheral device 210).

Subsequent to detecting that the computing device 200 is within the region 300 (e.g., room 600), the peripheral management component 400 can determine whether the computing device 200 has been moved to outside the region 300 (e.g., room 600) (e.g., performing the operational block 130 of FIG. 1). For example, the first signal (e.g., indicative of the geofence information, tracking information, movement information, lid information, connection information, or activity information) can indicate that the computing device 200 is outside the region 300 (e.g., room 600) after previously indicating that the computing device 200 was within the region 300 (e.g., room 600).

In response to determining that the computing device 200 has been moved to outside the region 300 (e.g., room 600), the peripheral management component 400 can determine a location of the peripheral device 210 relative to the computing device 200 (e.g., performing the operational block 130 of FIG. 1). For example, in response to the first signal indicating that the computing device 200 is outside the region 300 (e.g., room 600), the peripheral management component 400 can access the monitoring list of connected peripheral devices 210 when the computing device 200 was previously within the region 300, access a set of peripheral devices 210 currently still connected with the computing device 200 (e.g., still in wireless communication with the computing device 200; still in proximity to the computing device 200) outside the region 300 with the peripheral devices 210, and compare the monitoring list to the set. Any peripheral device 210 that is on the monitoring list but is not in the set can then be characterized (e.g., identified) as not connected with the computing device 200 (e.g., not in proximity to the computing device 200) based on an absence of the monitored wireless communications between the peripheral device 210 and the computing device 200. A peripheral device 210 can be characterized (e.g., identified) as not connected if there is an established wireless channel for communications between the peripheral device 210 and the computing device 200 but the wireless channel is lost, or if there are no wireless ping signals being exchanged between the peripheral device 210 and the computing device 200.

In response to characterizing a peripheral device 210 of the monitoring list as not connected (e.g., not in wireless communication with) the computing device 200 outside the region 300 (e.g., room 600), the peripheral management component 400 can activate (e.g., generate; transmit) an alert (e.g., lost device notification signal). The alert can be associated with (e.g., indicative of) the peripheral device 210 characterized as not connected with the computing device 200. For example, the computing device 200 can comprise a user interface that receives and responds to the alert from the peripheral management component 400 to present information regarding the identified, and potentially missing, peripheral device 210 to the user. For another example, another device (e.g., smartphone; smart tablet), separate from the computing device 200 of the user, can comprise a user interface that receives and responds to the alert from the peripheral management component 400 (e.g., transmitted from the computing device 200 or from the second computing device 450) to present information regarding the identified, and potentially missing, peripheral device 210 to the user. For another example, the alert from the peripheral management component 400 can be received by a centralized cloud control utility providing intelligent asset (e.g., computing devices and peripheral devices) tracking and management.

Figure 7:
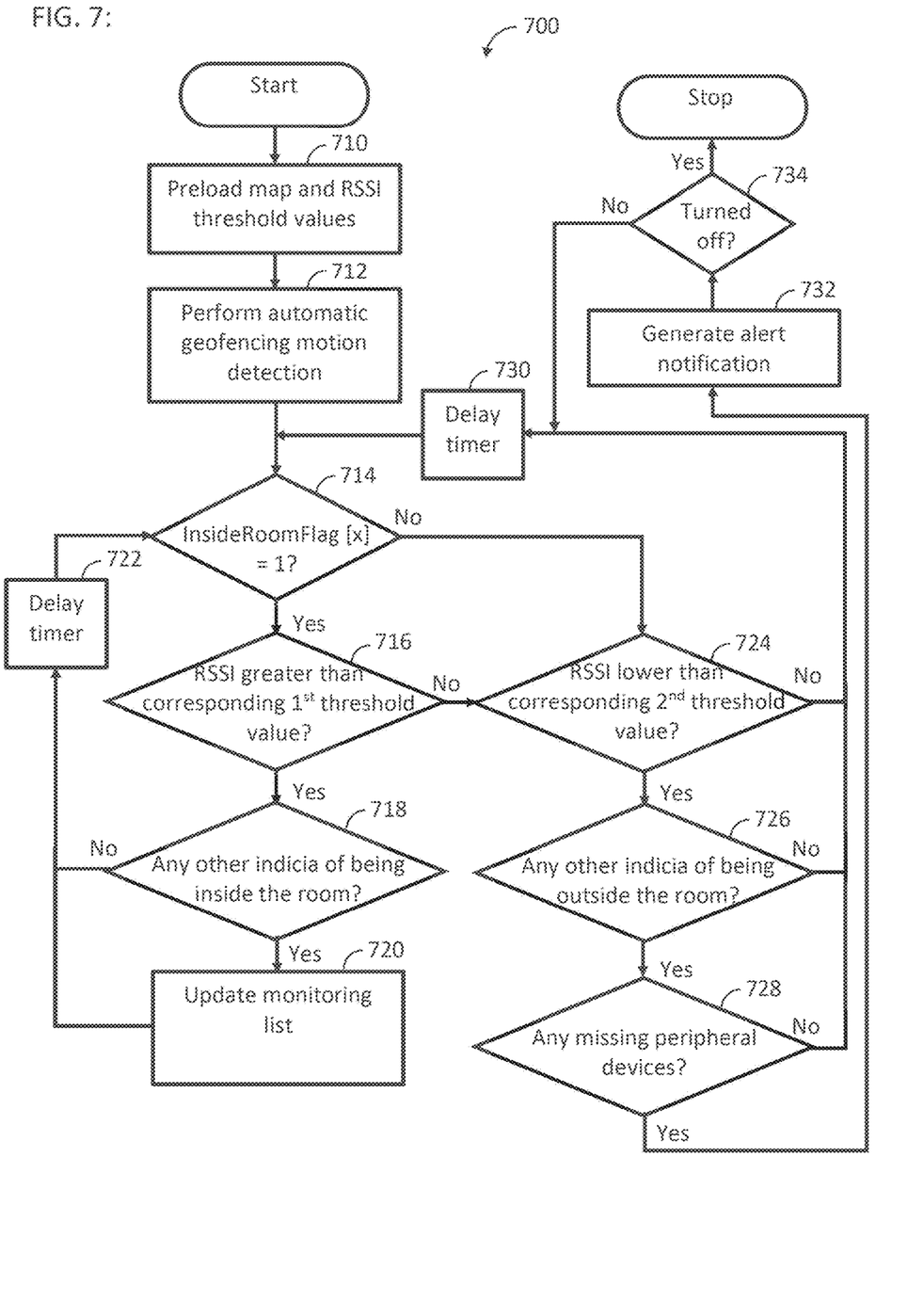
FIG. 7 is a flow diagram of another example method for automatic geofence arrival and departure detection by a background service operation in accordance with certain examples described herein.

FIG. 7 is a flow diagram of another example method 700 for automatic geofence arrival and departure detection by a background service operation in accordance with certain examples described herein. The background service operation can be running on the computing device 200 or on a second computing device 450 separate from the computing device 200 and to receive information from the computing device 200 (e.g., geofence information, tracking information, movement information, lid information, connection information, or activity information). The background service operation can be initiated when the receiver circuitry 230 of the computing device 200 detects a wireless beacon signal 310 that identifies (e.g., including the BLE beacon ID) of the wireless beacon transmitter 312. Otherwise, the background service operation can remain suspended and do nothing.

In an operational block 710, upon initiating the background service operation, the method 700 comprises preloading (e.g., automatically) the map of the office environment (e.g., meeting room map) to be used with the tracking information and the RSSI threshold criteria (e.g., threshold values) for the region 300 (e.g., rooms 600) to be used with the geofence information. In an operational block 712, the method 700 comprises performing automatic geofence arrival and departure detection (e.g., the method 500). For example, the background service operation can begin running the method 500 which can periodically (e.g., at temporal intervals of 0.5 second to 2 seconds) collect the geofence information and tracking information to be used by the background service operation.

In an operational block 714, the method 700 comprises checking whether any flags are indicative of the computing device 200 being within a room 600 (e.g., InsideRoomFlag [x]=1) based on the geofence information and the tracking information. In an operational block 716, the method 700 comprises, if a flag indicates that the computing device 200 is within a room 600, checking whether the RSSI is greater than a first threshold value (e.g., distance ranging information indicative of the computing device 200 being within the room 600). In an operational block 718, the method 700 comprises, if the RSSI is greater than the first threshold value corresponding to the room 600, checking whether any of the other information available to the background service operation (e.g., movement information, lid information, connection information, activity information) is indicative of the computing device 200 being inside the room 600.

In an operational block 720, the method 700 comprises, if the other information indicates that the computing device 200 is inside the room 600, updating or maintaining the monitoring list (e.g., BTDeviceMonitor[ID #]) to include all the peripheral devices 210 that are currently in wireless communication with the computing device 200. The monitoring list can be updated or maintained by a BT Device Monitoring Mechanism of the background service operation. The updating or maintaining the monitoring list in the operational block 720 is reached only after a flag indicates that the computing device 200 is within a room 600 (e.g., InsideRoomFlag[x]=1) in the operational block 714 and after the RSSI is determined to be greater than the first threshold value (e.g., indicative of the computing device 200 being within the room 600). Thus, if the three criteria of the operational blocks 714, 716, and 718 are met, the monitoring list is updated or maintained. In addition, if the user manually turns off a specific registered peripheral device 210 (e.g., a peripheral device 210 that is on the monitoring list), updating the monitoring list can comprise actively removing the specific registered peripheral device 210 from the monitoring list. In an operational block 722, the method 700 comprises, after updating the monitoring list in the operational block 720 or if the other information checked in the operational block 718 is not indicative of the computing device 200 being inside the room 600, waiting for the temporal interval (e.g., 0.5 second to 2 seconds) before returning to the operational block 714.

In an operational block 724, the method 700 comprises, if the RSSI is not greater than the first threshold value, checking whether the RSSI is lower than a second threshold value (e.g., distance ranging information indicative of the computing device 200 being outside the room 600). In an operational block 726, the method 700 comprises, if the RSSI is lower than the second threshold value corresponding to the room 600, checking whether any of the other information available to the background service operation (e.g., movement information, lid information, connection information, activity information) is indicative of the computing device 200 being outside the room 600. In an operational block 728, the method 700 comprises, if the other information indicates that the computing device 200 is outside the room 600, checking whether any peripheral devices 210 of the monitoring list are in the set of peripheral devices 210 currently in wireless communication with the computing device 200. In an operational block 730, the method comprises 700 waiting for the temporal interval before returning to the operational block 714, and the operational block 730 is reached if the RSSI is not lower than the second threshold value in the operational block 724, if the other information available to the background service operation are not indicative of the computing device 200 being outside the room 600 in the operational block 726, or if there are no peripheral devices 210 of the monitoring list that are not in the set of peripheral devices 210 currently in wireless communication with the computing device 200 in the operational block 728.

In an operational block 732, the method 700 comprises activating (e.g., generating) an alert (e.g., notification signal; BT Device Lost Alert Notification) that is associated with (e.g., indicative of) the identified peripheral device 210. The operational block 732 is reached if there is a peripheral device 210 of the monitoring list that is not in the set of peripheral devices 210 currently in wireless communication with the computing device 200 (e.g., a peripheral device 210 that was potentially left behind in the room 600 when the computing device 200 was removed from the room 600), The alert is activated if the RSSI is determined to not be greater than the first threshold value in the operational block 716, the RSSI is determined to be less than the second threshold value in the operational block 724, the other information available to the background service operation (e.g., movement information, lid information, connection information, activity information) is indicative of the computing device 200 being outside the room 600 in the operational block 726, and a peripheral device 210 of the monitoring list is missing from the set of peripheral devices 210 currently in wireless communication with the computing device 200 in the operational block 728. The alert can be generated by the background service operation and in response, the computing device 200 can inform the user in real-time of the potentially missing peripheral device 210. If the computing device 200 is in sleep mode, the computing device 200 can be placed in a non-sleep (e.g., active) mode to inform the user or the alert can be transmitted to a second computing device 450 of the user (e.g., via the network 460), separate from the computing device 200, to inform the user in real-time of the potentially missing peripheral device 210.

In an operational block 734, the method 700 comprises evaluating (e.g., checking) whether the user has terminated the background service operation. The method 700 comprises, if the user has terminated the background service operation, waiting for the temporal interval before returning to the operational block 714. If the user has terminated the background service operation, the method 700 is terminated.

Although commonly used terms are used to describe the systems and methods of certain examples for ease of understanding, these terms are used herein to have their broadest reasonable interpretations. Although various aspects of the disclosure are described with regard to illustrative examples and examples, the disclosed examples and examples should not be construed as limiting. Conditional language, such as, among others, "can," "could," "might," or "may," unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be appreciated that the examples disclosed herein are not mutually exclusive and may be combined with one another in various arrangements. In addition, although the disclosed methods and apparatuses have largely been described in the context of plasma compression systems, various examples described herein can be incorporated in a variety of other suitable devices, methods, and contexts.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

What is claimed is:

1. A non-transitory computer-readable medium having stored thereon a set of instructions that, when executed by a processing unit of a computing device, causes the computing device to:
    detect that the computing device is located in a particular region based on receipt by the computing device of a wireless beacon signal and based on:
        a comparison of a signal strength of the wireless beacon signal to a first threshold value;
        an angle of arrival or an angle of departure of the wireless beacon signal;
        inertial navigation tracking of the computing device;
        a comparison of a temporal period during which the computing device is substantially motionless to a second threshold value;
        a state of a lid of the computing device; or
        an activity in which the computing device is being used;
    in response to detecting that the computing device is located in the particular region, identify a peripheral device connected to the computing device;
    detect that the computing device has been moved outside of the particular region;
    in response to detecting that the computing device has been moved outside of the particular region, determine a location of the peripheral device; and
    in response to determining that the location of the peripheral device is in the particular region, activate a lost device notification.

2. The non-transitory computer-readable medium of claim 1, wherein the set of instructions, when executed by the processing unit, causes the computing device to detect that the computing device is located in the particular region based on the comparison of the signal strength of the wireless beacon signal to the first threshold value.

3. The non-transitory computer-readable medium of claim 1, wherein the set of instructions, when executed by the processing unit, causes the computing device to detect that the computing device is located in the particular region based on the angle of arrival or the angle of departure of the wireless beacon signal.

4. The non-transitory computer-readable medium of claim 1, wherein the set of instructions, when executed by the processing unit, causes the computing device to detect that the computing device is located in the particular region based on the inertial navigation tracking of the computing device.

5. The non-transitory computer-readable medium of claim 1, wherein the wireless beacon signal includes an identification of the particular region.

6. The non-transitory computer-readable medium of claim 5, wherein the set of instructions, when executed by the processing unit, causes the computing device to:
    access a preloaded map of an environment including the particular region; and
    calculate a position of the computing device relative to the preloaded map.

7. The non-transitory computer-readable medium of claim 1, wherein the set of instructions, when executed by the processing unit, causes the computing device to detect that the computing device is located in the particular region based on the comparison of the temporal period during which the computing device is substantially motionless to the second threshold value.

8. The non-transitory computer-readable medium of claim 1, wherein the set of instructions, when executed by the processing unit, causes the computing device to detect that the computing device is located in the particular region based on the activity in which the computing device is being used.

9. The non-transitory computer-readable medium of claim 1, wherein the set of instructions, when executed by the processing unit, causes the computing device to identify the peripheral device connected to the computing device by obtaining a list of peripheral devices in wireless communication with the computing device.

10. The non-transitory computer-readable medium of claim 1, wherein the set of instructions, when executed by the processing unit, causes the computing device to activate the lost device notification via a background service operation of the computing device.

11. A non-transitory computer-readable medium having stored thereon a set of instructions that, when executed by a processing unit of a computing device, causes the computing device to:
    generate first information indicative of whether the computing device is located within a particular region or outside of the particular region in response to sensor information indicative of whether the computing device is receiving a wireless beacon signal generated within the particular region and based on:
        a comparison of a signal strength of the wireless beacon signal to a first threshold value;
        an angle of arrival or an angle of departure of the wireless beacon signal;
        inertial navigation tracking of the computing device;
        a comparison of a temporal period during which the computing device is substantially motionless to a second threshold value;
        a state of a lid of the computing device; or
        an activity in which the computing device is being used;
    generate second information indicative of a connection status of a peripheral device associated with the computing device;
    in response to the first information indicating that the computing device is located within the particular region concurrently with the second information indicating that the peripheral device is connected with the computing device at a first time, obtain a list of peripheral devices connected with the computing device;
    in response to the first information indicating that the computing device is located outside of the particular region at a second time subsequent to the first time, identify one of the peripheral devices from the list that is not connected with the computing device; and
    generate an alert signal for the identified peripheral device.

12. The non-transitory computer-readable medium of claim 11, wherein the set of instructions, when executed by the processing unit, causes the computing device to identify one of the peripheral devices from the list that is not connected with the computing device by comparing the peripheral devices of the list to a set of peripheral devices connected to the computing device while the computing device is located outside of the particular region.

13. The non-transitory computer-readable medium of claim 11, wherein the set of instructions, when executed by the processing unit, causes the computing device to generate the first information based on the comparison of the signal strength of the wireless beacon signal to the first threshold value.

14. The non-transitory computer-readable medium of claim 13, wherein the set of instructions, when executed by the processing unit, causes the computing device to generate the first information based on the angle of arrival or the angle of departure of the wireless beacon signal.

15. A computing device comprising:
memory comprising instructions; and
a processor to execute the instructions to:
  generate first information indicative of whether the computing device is located within a particular region or outside of the particular region based on a wireless beacon signal and based on:
    a comparison of a signal strength of the wireless beacon signal to a first threshold;
    an angle of arrival or an angle of departure of the wireless beacon signal;
    inertial navigation tracking of the computing device;
    a comparison of a temporal period during which the computing device is substantially motionless to a second threshold;
    a state of a lid of the computing device; or
    an activity in which the computing device is being used;
  generate second information indicative of a connection status of a peripheral device associated with the computing device;
  in response to determining that the first information indicates that the computing device is located within the particular region and the second information indicates that the peripheral device is connected with the computing device at a first time, generate a list of peripheral devices connected with the computing device;
  in response to determining that the first information indicates that the computing device is located outside of the particular region at a second time subsequent to the first time, identify one of the peripheral devices from the list that is not connected with the computing device; and
  cause an alert associated with the identified peripheral device to be presented via the computing device.

16. The computing device of claim 15, wherein:
the particular region comprises a room; and
the wireless beacon signal is broadcast by a second computing device located in the room.

17. The computing device of claim 16, wherein the processor is to execute the instructions to generate the first information based on the comparison of the signal strength of the wireless beacon signal to the first threshold.

18. The computing device of claim 17, wherein the processor is to execute the instructions to generate the first information based on the comparison of the temporal period during which the computing device is substantially motionless to the second threshold.

19. The computing device of claim 18, wherein the processor is to execute the instructions to generate the first information based on the angle of arrival or the angle of departure of the wireless beacon signal.

20. The computing device of claim 16, wherein:
the processor is to execute the instructions to generate the first information based on the inertial navigation tracking of the computing device; and
the inertial navigation tracking of the computing device is based on data generated by an accelerometer and a gyroscope of the computing device.

21. The computing device of claim 16, wherein the computing device comprises a notebook computer and the peripheral device comprises a wireless mouse, a wireless speaker, or a set of wireless headphones.

* * * * *